(12) United States Patent
Michelon et al.

(10) Patent No.: US 12,235,401 B2
(45) Date of Patent: Feb. 25, 2025

(54) METHOD FOR IMPROVING 2D SEISMIC ACQUISITION

(71) Applicant: ENEVA S.A., Rio de Janeiro (BR)

(72) Inventors: Diogo Michelon, Rio de Janeiro (BR); Joao Luiz Caldeira, Rio de Janeiro (BR); Roberto Baldanza Ribeiro, Rio de Janeiro (BR); Eneas Neto, Rio de Janeiro (BR); Frederico Silveira De Miranda, Rio de Janeiro (BR)

(73) Assignee: ENEVA S.A., Rio de Janeiro (BR)

( * ) Notice: Subject to any disclaimer, the term of this patent is extended or adjusted under 35 U.S.C. 154(b) by 707 days.

(21) Appl. No.: 17/432,766

(22) PCT Filed: Feb. 20, 2020

(86) PCT No.: PCT/BR2020/050051
§ 371 (c)(1),
(2) Date: Oct. 29, 2021

(87) PCT Pub. No.: WO2020/168406
PCT Pub. Date: Aug. 27, 2020

(65) Prior Publication Data
US 2022/0146699 A1    May 12, 2022

(30) Foreign Application Priority Data
Feb. 20, 2019    (BR) .......................... 1020190034653

(51) Int. Cl.
*G01V 1/30*    (2006.01)
*G01V 1/104*    (2006.01)
*G01V 1/18*    (2006.01)

(52) U.S. Cl.
CPC ................ *G01V 1/30* (2013.01); *G01V 1/104* (2013.01); *G01V 1/181* (2013.01);
(Continued)

(58) Field of Classification Search
None
See application file for complete search history.

(56) References Cited

U.S. PATENT DOCUMENTS

| | | | |
|---|---|---|---|
| 3,050,148 A | * | 8/1962 | Lee .......................... G01V 1/13 181/103 |
| 3,437,170 A | | 4/1969 | Brock et al. |

(Continued)

FOREIGN PATENT DOCUMENTS

GB        1481090 A    7/1977

OTHER PUBLICATIONS

Wood, Lawrence C., and Sven Treitel. "Seismic signal processing." Proceedings of the IEEE 63.4 (1975): 649-661. (Year: 1975).*
(Continued)

*Primary Examiner* — Raymond L Nimox
(74) *Attorney, Agent, or Firm* — LUCAS & MERCANTI, LLP

(57) ABSTRACT

The present invention pertains to the fields of geology and geophysics, is designed for use for onshore seismic acquisition. The method involves distributing and arranging the elements used in the acquisition of two-dimensional seismic data from dynamite sources, enabling imaging quality to be improved. The use of sources of dynamite with single charges and variable weight at each shot point results in the generation of seismic waves with variable energy that provide reflections with complementary frequency and amplitudes content for use in the geophysical imaging of geological features. The stacking of this incremental content generated by charges of variable weights results in a significant improvement in the resolution of the processed seismic data on both the continuity of stratigraphic reflectors and existing geological framework.

17 Claims, 6 Drawing Sheets

(52) U.S. Cl.
CPC ........... *G01V 2210/1212* (2013.01); *G01V 2210/1299* (2013.01); *G01V 2210/1429* (2013.01); *G01V 2210/324* (2013.01); *G01V 2210/60* (2013.01)

(56) References Cited

U.S. PATENT DOCUMENTS 4,004,267 A    1/1977  Mayne
4,217,571 A    8/1980  Hughes et al.

OTHER PUBLICATIONS

International Search Report for corresponding application PCT/BR2020/050051 dated Jun. 12, 2020 and English translation.

\* cited by examiner

Present invention
- Charges of 1 Kg / 0.75 Kg / 0.5 Kg / 0.25 Kg
- Coupling at 3 m
- SPs spaced-away 40 m

Traditional Method
- Charges of 1 Kg
- Coupling at 3 m
- SPs spaced-away 80 m

Present invention
- Charges of 0.5 Kg / 0.250 Kg / 0.125 Kg / 0.062 Kg.
- Coupling at 3 m
- SPs spaced-away 80 m

2 charges
- Charges of 0.5 Kg / 0.250 Kg
- Coupling at 3 m
- SPs spaced-away 80 m

METHOD FOR IMPROVING 2D SEISMIC ACQUISITION

CROSS REFERENCE TO RELATED APPLICATION

This Application is a 371 of PCT/BR2020/050051 filed on Feb. 20, 2020 which, in turn, claimed the priority of Brazilian Patent Application No. BR 1020190034653 filed on Feb. 20, 2019, both applications are incorporated herein by reference.

FIELD OF INVENTION

The present invention pertains to the fields of geology and geophysics, more precisely, and it is employed in onshore seismic acquisition.

BACKGROUND OF THE INVENTION

Reflection seismic is a geophysical research method that uses the principles of seismology to estimate the properties of the Earth's subsurface based on the reflection of seismic waves. This method requires the use of a seismic energy source, such as, for example, an explosive, air guns or mechanical vibrators.

Upon recording the amplitude and transit time that a reflected wave takes to travel in the subsurface, reflecting on geological interfaces and returning to the receiver, it is possible to estimate the positioning of the interfaces that generated the reflections.

Reflection seismic is the most reliable and useful method to be used in sedimentary basins for hydrocarbon exploration, due to the possibility of recomposing geological events in an interpretable way in sections that, acquired in several different lines and directions, allowing the interpretations to be interpolated and analyzed in the form of maps.

There can be an offshore or onshore reflection seismic acquisition. For onshore acquisitions, hydraulic vibrators and dynamite are the most used energy sources. Hydraulic vibrators are equipment capable of producing acoustic waves from piston impacts against the ground. The possibility of controlling parameters such as time, frequency and force, necessary to generate the impacts (sweeps), allows the restoration of the transit time of the waves generated by the vibrators, in the seismic processing carried out after the acquisition, to be calibrated in a more controlled way.

The use of sources such as dynamite makes it impossible to control these abovementioned parameters, since the chemical reaction and wave generation is instantaneous, providing more challenges for the seismic processing that seeks to recompose the trajectories of these waves. The methodology described below aims to suppress, from an arrangement of different charge weights, the lack of control over the frequency increment that exists in other types of sources.

Part of the imaging improvements are also associated with the evolution of equipment and knowledge, making it possible to minimize geological uncertainties.

STATE OF THE ART

Some prior art documents describe methods, arrangements and technologies aimed at enhancing and refining the seismic acquisition technique.

Document U.S. Pat. No. 3,437,170, "CONTROL OF ENERGY SPECTRUM IN MARINE SEISMIC EXPLORATION", describes the use of air guns of different compressions, arranged in a spaced-apart arrangement, for marine operations where bubbles of different sizes are generated and, consequently, seismic waves that allow recordings at different frequencies.

Offshore seismic acquisitions differ substantially from onshore and, consequently, from the present invention, mainly regarding the concept of sources for the generation of seismic waves. Air guns sources, used for offshore seismic acquisitions, do not generate seismic waves through chemical reactions, such as dynamite, used in onshore seismic acquisitions. Air guns are sources with full control of compressed air load parameters and frequency of generated waves.

In addition, the shootings array for offshore seismic acquisition can be continuous and arranged with several air guns to obtain a seismic wave with the best possible control.

Document U.S. Pat. No. 4,004,267, "DISCRETE FREQUENCY SEISMIC EXPLORATION USING NON-UNIFORM FREQUENCY SPECTRA", depicts a seismic investigation method wherein a set of discrete, narrow-bandwidth seismic waves is transmitted to the ground. These wave packets have different bandwidths with different dominant frequencies, forming a spectrum-controlled composite signal.

This method uses vibroseis trucks as sources, unlike the present invention, which proposes the use of dynamite. The use of a vibroseis source makes it possible to generate wave packets centered on specific frequencies at certain time intervals to eliminate the oscillatory effect.

Document U.S. Pat. No. 4,217,571, "STUTTER SEISMIC SOURCE", describes a seismic investigation method wherein three explosive charges are preferably detonated in sequence, in order to amplify the seismic signal to be received. For this, the first and third charges are the same size and the dimension of the second charge is selected to provide a pulse amplitude at least twice as significant as that of the first and third charges.

The method consists of more than one charge at the same shot point, which, in theory, enables the generation of a grouping of frequencies that provide more power in the wave dispersion, making it possible to reach deeper levels.

The present invention aims at generating seismic waves using reduced charges at separate shot points, acquiring the individual records with different powers and processing them together, thus generating a frequency complement in the data stacking. This allows for an increase in quality.

BRIEF DESCRIPTION OF THE INVENTION

The present invention pertains to the fields of geology and geophysics and is applied to onshore seismic acquisitions. It is a method of distribution and arrangement of elements used in the acquisition of two-dimensional seismic data acquired by explosive sources that improves image quality. The use of shot points with unique charges and different weights in each one of them, results in the generation of different waves sizes registered with distinct and complementary frequency content. The stacking of this incremental content generated by charges of different weights promotes a significant improvement in the resolution of the final processed data both in the continuity of the reflectors and the existing geological discontinuities.

BRIEF DESCRIPTION OF THE FIGURES

To illustrate the object of this invention, there follow the descriptions of the figures that will be presented below.

DETAILED DESCRIPTION OF THE INVENTION

The present invention consists of a method developed to improve the imaging resulting from 2D seismic acquisition. With a more efficient dispersion of the wavefronts generated from explosive sources—preferably dynamite—, it is possible to incrementally expand the frequency content of the processed data, causing a significant improvement in the seismic sections, especially in the resolution and continuity of the reflectors.

It comprises, in its preferred configuration, at least the following steps:
  Step 1: Incremental distribution of charges;
  Step 2: Individual firing of charges; and
  Step 3: Processing and stacking of records performed under the previous conditions.

Step 1, Incremental Distribution of Charges, comprises the organization of the disposition of explosive charges with reduced weight amounts at each shot point. There are defined the distance and depth that will be used to separate the shot points, the number of times the initial charge will suffer reductions in the ratios that will be presented below and the maximum or minimum charge for the calculation of the increment, depending on the objective designed for the seismic program.

With this, the distribution of the charges along the seismic line is carried out according to the incremental planning, enabling the seismography team to carry out the records.

C, 3/4C, C/2, C/4 . . . C/n

Wherein C is a reference charge weight value.

The value of C is preferably 1 Kg or 0.5 Kg and the configuration of the seismic line is consequently preferably arranged as follows:
  1 Kg; 0.75 Kg; 0.5 Kg; 0.25 Kg; or
  0.5 Kg; 0.25 Kg; 0.125 Kg; 0.062 Kg.

The use of dynamite with different weights allows the waves to propagate with different energies due to the elastic properties existing in rocks in the subsurface. The waves generated by smaller dynamite suffer less elastic resistance from the Earth, releasing, proportionally, greater propagation of energy. This effect is outstanding when recording reflections that have different frequency ranges and bandwidths for each charge used.

The charge positioning interval, shot point interval (SPI), is preferably 40 m, if the reference charge (C) is 1 Kg, and 80 m, if the reference charge (C) is 0.5 Kg. Its variation occurs according to the area of geophysical investigation. The depths for positioning the charges can vary from 1.5 m to 5 m, and is preferably 3 m.

In step 2, Individual Firing of Charges, the charges are detonated and the reflections of the seismic waves are recorded.

Figure 5:
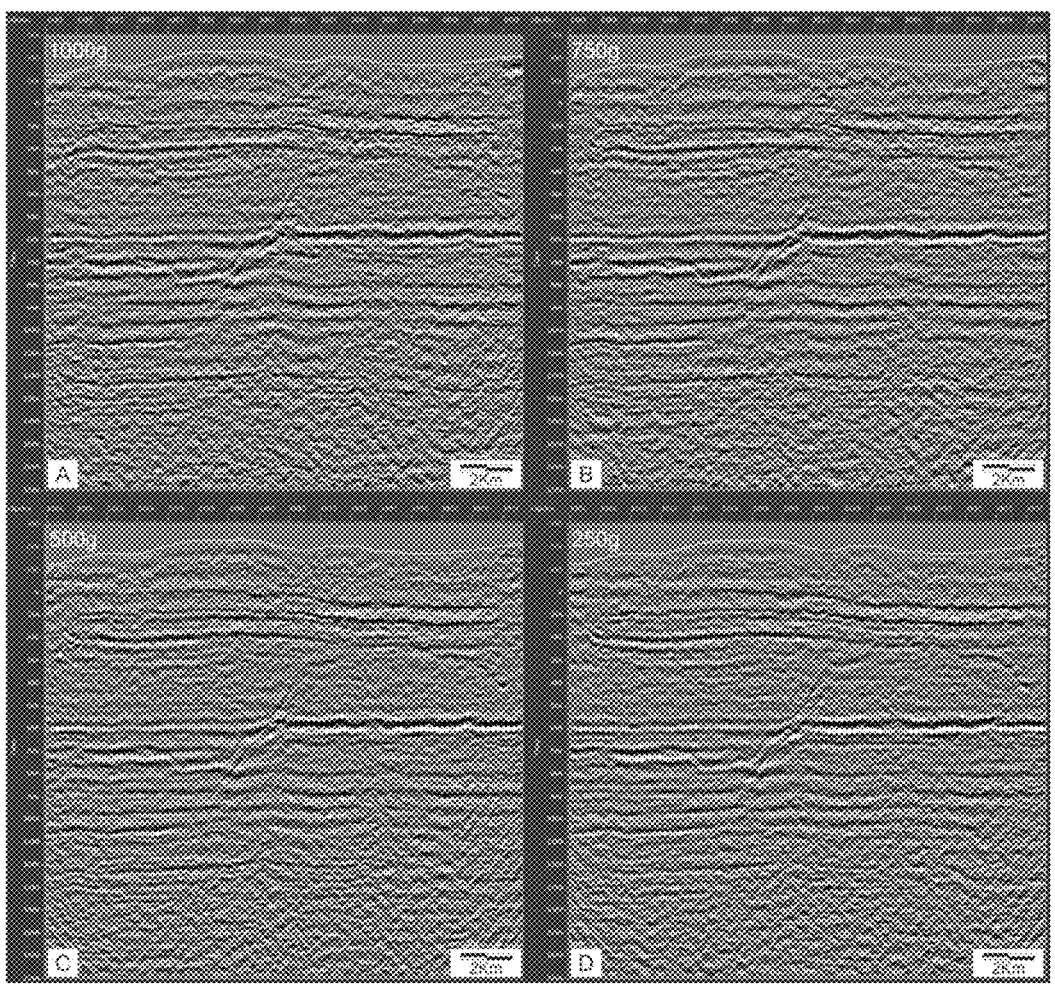
FIG. 5 shows the migrated seismic section individually for each subset corresponding to the four different charge weights: (A) 1 Kg, (B) 0.75 Kg, (C) 0.5 Kg and (D) 0.25 Kg.
Figure 6:
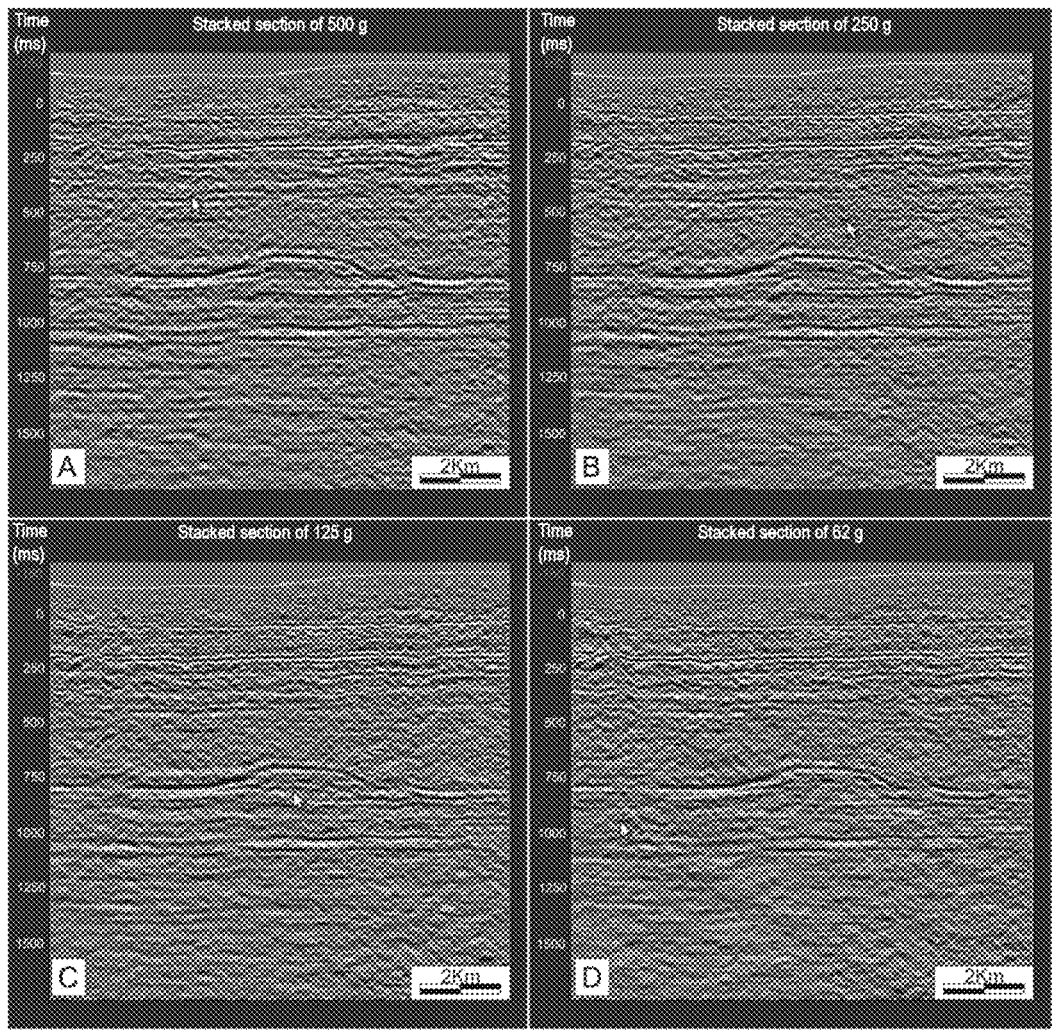
FIG. 6 shows the migrated section individually for each subset corresponding to the four different charge weights: (A) 0.5 Kg, (B) 0.250 Kg, (C) 0.125 Kg and (D) 0.062 Kg.

Each shot point (SP) has a unique explosive charge, detonated individually so that the recordings of reflections occur in a manner corresponding to the weights of the sources. This procedure allows obtaining images related to each charge intensity used in the acquisition, as shown in FIGS. 5 and 6.

The recording of the reflections of the seismic waves is done by an arrangement of individual geophones with high sensitivity with a cut-off frequency, preferably, of 5 Hz. For each detonation, 150 channels are preferably connected on each side of the shot. The geophones are preferably spread symmetrically, 20 m equidistant, forming the 3000-20-0-20-3000 m recording device, with the source located at the 0 m point.

Step 3, Processing and stacking of records, allows the integration of the results obtained in the form of a seismic section for geophysical and geological interpretation, and which comprises, in its preferred configuration, the following sub-steps:
  sub-step 3.1: Geometry;
  sub-step 3.2: Static Corrections;
  sub-step 3.3: Attenuation of coherent noises (Shot Domain);
  sub-step 3.4: Deconvolution;
  sub-step 3.5: Velocity Analysis;
  sub-step 3.6: Coherent Noise Attenuation (CDP Domain);
  sub-step 3.7: Pre-stacking migration;
  sub-step 3.8: Stacking; and
  sub-step 3.9: Filtering.

In sub-step 3.1, Geometry, the location tables of each source (shot) and each receiver (geophones) are built up by means of their spatial positioning (x, y, and z), wherein coordinates "x" and "y" are a geographic positioning and the value of "z" is the positioning in subsurface (time or depth). This information is inserted in the header of each trace, in order to allow the reorganization and thus, the execution of all the other processing steps.

In sub-step 3.2, Static Corrections, time corrections are made that cause distortions in the focusing of reflections and can also generate false structures, due to thickness and velocity variations of the weathering layers. These layers have thicknesses, which can vary from 0 to 200 m, and have low velocities, preferably between 400 m/s and 1500 m/s. The corrections are calculated by using the seismic refraction method and applying tomography techniques in such a way that, after being calculated, they are replaced with a layer with a higher velocity, above 2000 m/s.

In sub-step 3.3, Coherent Noise Attenuation, the main noises are filtered out after transforming a seismogram in the space x time domain into the spatial frequency x temporal frequency domain via fast Fourier transform in two directions (FFT2D).

They appear in seismograms as linear events that are generated mainly by surface waves (ground roll) and by the reverberations of refracted waves in the weathering layers.

In this domain, after drawing a polygon where the noises occur, the amplitudes are zeroed and the inverse transformation is applied, returning to the space x time domain with the noises attenuated.

In sub-step 3.4, Deconvolution, it is considered that the seismic trace is the convolution of a random time series that are the reflection coefficients of the geological layers with the source signature, in this case, the seismic pulse generated by the detonation of one or more charges of dynamite.

The Wiener filter allows to calculate the inverse filter that will transform the pulse of the long duration source into a very compressed pulse from the autocorrection of the seismic trace and the Cross-correlation of the seismic traces with a desired output. At the end of this sub-step, the original seismic trace is convoluted with the inverse filter, and the pulse compression enables the separation and consequent identification of the several geological layers.

In sub-step 3.5, Velocity Analysis, the velocity analysis in the common depth point (CDP) domain is performed. Reflections for different source-receiver distances generate hyperbolic time-distance curves. Each velocity that best horizontalizes the hyperbola of a CDP and that causes greater amplitudes in the semblance panel (correlation between all traces of a CDP) is visually chosen.

Sub-step 3.6, Coherent Noise Attenuation in the CDP domain, aims to attenuate multiple reflections whose trajectories are reflected at least once on the free surface and twice on the same reflector appearing at the time corresponding to twice of the primary reflection time. As at this time the velocity is higher, the primary reflection will appear horizontalized inside the CDP while the multiple reflection will appear undercorrected being the target of the filters. The most used filters are those that use the 2D Fourier transform or the Radon transform.

In sub-step 3.7, Pre-stacking migration, the objective is to focus the diffracted energies at the position of the diffractor point, due to the fact that, during the process of propagation of the seismic energy, each point in the subsurface works as a spreader (diffractor), deflecting energy in different directions. Methods that migrate recorded data with any source-receiver offset are called pre-stack migration methods.

In sub-step 3.8, Stacking, the redundancy provided by the CMP technique allows to have a statistical sampling of several seismic attributes, the amplitude of the reflection being one of them. The most used calculation method to find this value, in view of the various measurements performed (one for each CMP trace) is the arithmetic mean of the samples at a given time. To calculate this mean, it is necessary to horizontalize the hyperbolas for each reflector (or migrate the same before the stacking), by using the velocities obtained in the process of Velocity Analysis. With this procedure, the signal-to-noise ratio increases and, the greater the redundancy, the greater the attenuation of random noise.

In sub-step 3.9, Filtering, the objective is to eliminate or attenuate the residual noise still present in the data. There are several widely known tools in the field of geology and geophysics, commonly used for this purpose, wherein there can be highlighted: FXDecon, which attenuates random noise, FK filter, which attenuates linear noise, and the frequency filter.

The seismic section, consisting of records made with the methodology proposed in this document, results in an image with good quality due to the composition of the frequency content provided by each one of the charges with different weights.

The present invention enables an improvement in the quality of seismic data, providing to the interpreters more precision that allows more control, helping to reduce the uncertainties existing in the study of the geology of the area.

TESTS

Two comparative tests were performed: the first test, between the traditional arrangement method, with equal and equidistant charges in 37.5% of the line, and the present invention with alternating equidistant charges with 4 different weights in 62.5% of the line. The second test, between a method composed of alternating equidistant charges with 2 different weights on 66.6% of the line, and the present invention with alternating equidistant charges with 4 different weights on 33.4% of the line. The results of the final processed sections can be seen in FIGS. 7 and 8.

Figure 1:
FIG. 1 illustrates the distribution of sources used in the traditional method and in the present invention.
Figure 1:
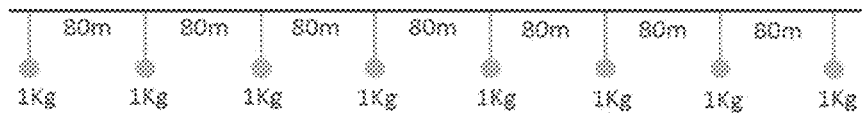
Figure 2:
FIG. 2 illustrates the distribution of charges used in the present invention in configurations with two and four different charge weights.
Figure 2:
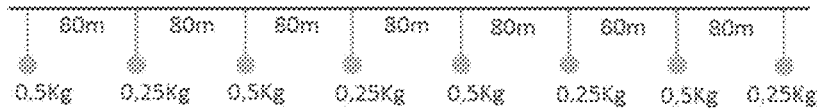

The parameters used in the first test, related to the traditional method (FIG. 1) were: dynamite with a charge of 1 Kg, equidistant 80 m, coupled in holes with a depth of 3 m and distributed over 6 Km of a seismic line with 16 Km in total.

In the method of the present invention, dynamites were used with alternate charges, equidistant 40 m, distributed in a sequential decreasing way: 1 Kg, 0.75 Kg, 0.5 Kg, 0.25 Kg, coupled in 3 m depth holes and distributed over the 10 Km remaining of a line with 16 Km in total. This means that redundancy of charges of the same weight occurred every 160 meters, allowing each shot of equal weight to be tested 100 times.

Figure 3:
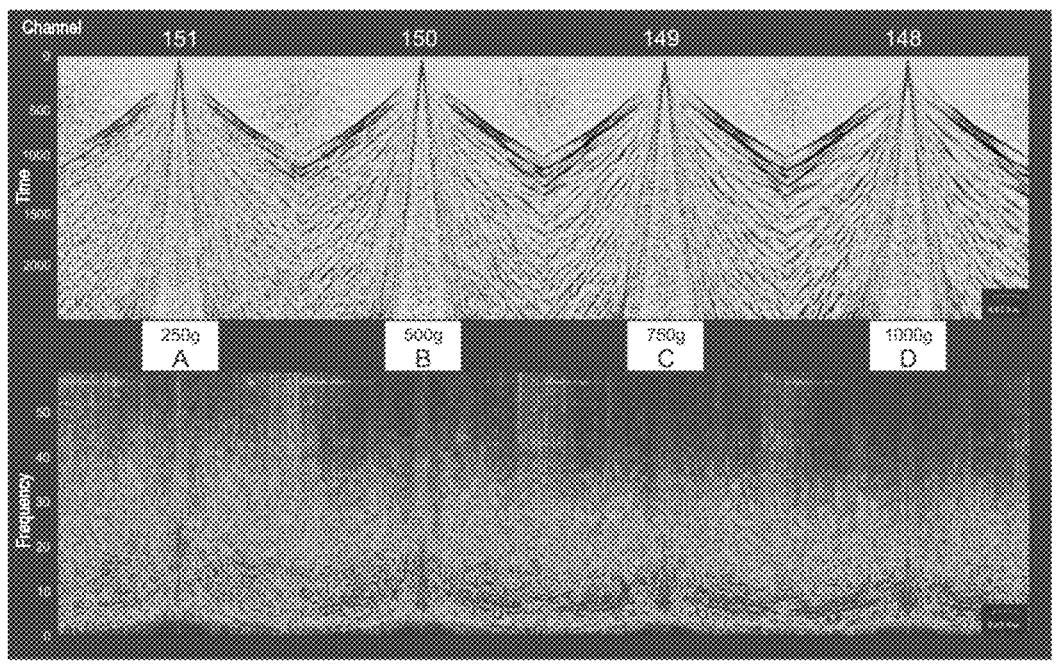
FIG. 3 shows the records of the sections in the CDP domain and the F-X spectrum for the charges: (A) 0.25 Kg, (B) 0.5 Kg, (C) 0.75 Kg and (D) 1 Kg.
Figure 4:
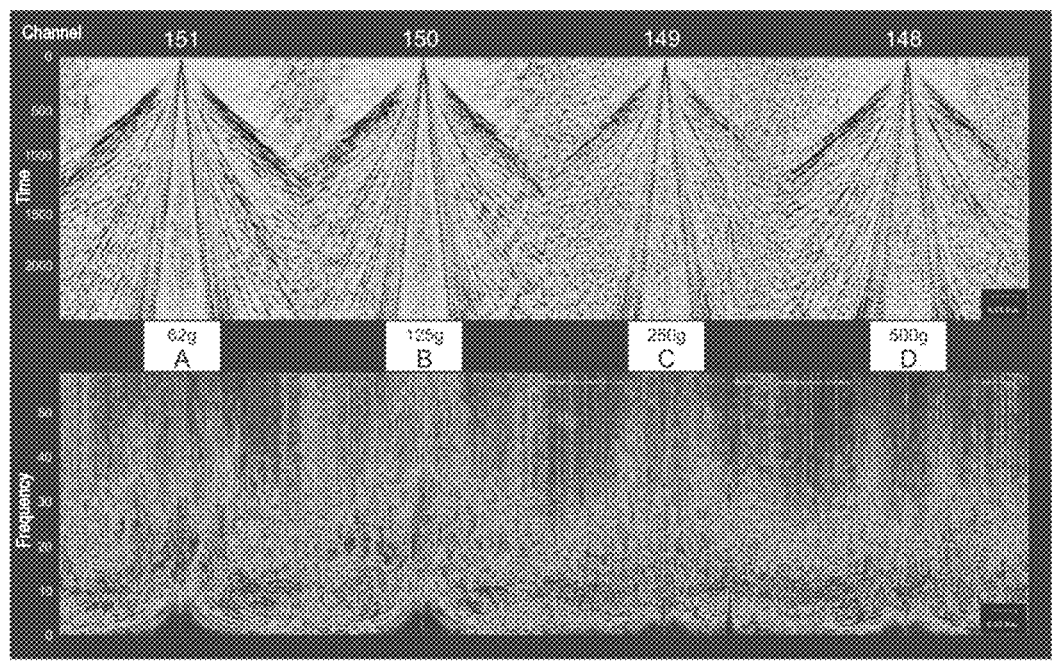
FIG. 4 shows the records of the sections in the CDP domain and the FX spectrum for the charges: (A) the charge of 0.062 Kg, (B) 0.125 Kg, (C) 0.250 Kg and (D) 0.5 Kg.

The upper part of FIG. 3 shows four records corresponding to each charge weight used. As expected, there is a notable difference in frequency content, wherein FIG. 3D, obtained with 1000 g charge, has lower dominant frequencies, and FIG. 3A, which corresponds to 250 g, has higher dominant frequencies. Note that the ground roll, characterized by low frequencies and high amplitudes, is more evident in FIG. 3D than in FIG. 3A.

The lower part of FIG. 3 shows the frequency contents corresponding to the four shots containing different charges. There is a reduction in the lower frequencies content, represented by the green color amplitudes at the top of the section, seen from the heavier to the lighter source weight.

The 1000 g charge has a higher content of amplitude and more abrupt limits of values within the window of 1 to 10 Hz (green colors) and another in 15 Hz (purple colors) (FIG. 3D).

The 250 g charge has frequency content from 5 Hz to 40 Hz distributed more smoothly (FIG. 3A) than heavier sources. The smooth transition of recorded frequency content from the firing of lighter charges generates a more uniform frequency spectrum.

To compare the quality of the migrated sections, we have applied the same standard processing flow to the five datasets: tomographic static correction, F-K filter, deconvolution, gain, velocity analysis, residual static, migration, post-stacking filters.

FIGS. 5 and 6 show the migrated seismic sections, individually, obtained from the four data subsets with equivalent source weights for each test. FIGS. 5A, 5B, 5C and 5D correspond to the source charges with 1000 g, 750 g, 500 g and 250 g, respectively, and FIGS. 6A, 6B, 6C and 6D correspond to 500 g, 250 g, 125 g and 62 g, respectively.

Figures 7, 8:
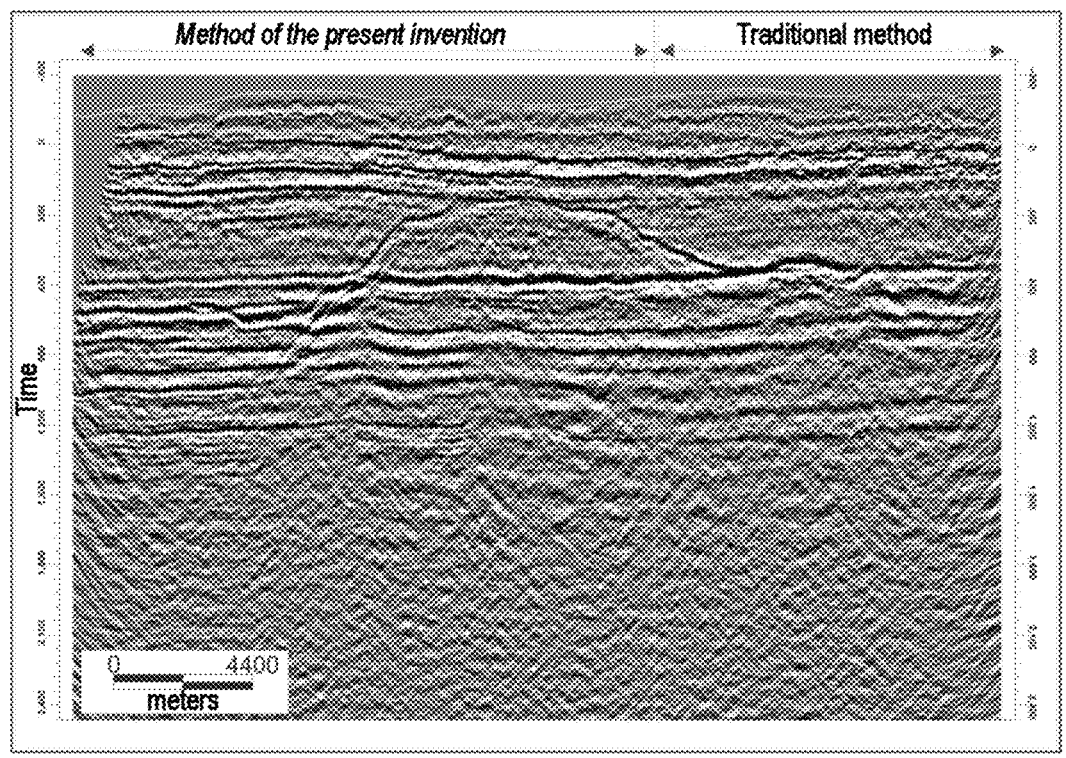
FIG. 7 shows the full stack seismic section segmented by the acquisition by using the traditional method and the method of the present invention.
FIG. 8 shows the full stack seismic section segmented by the acquisition by using the method of the present invention in configurations with two and four different charge weights.
Figure 9:
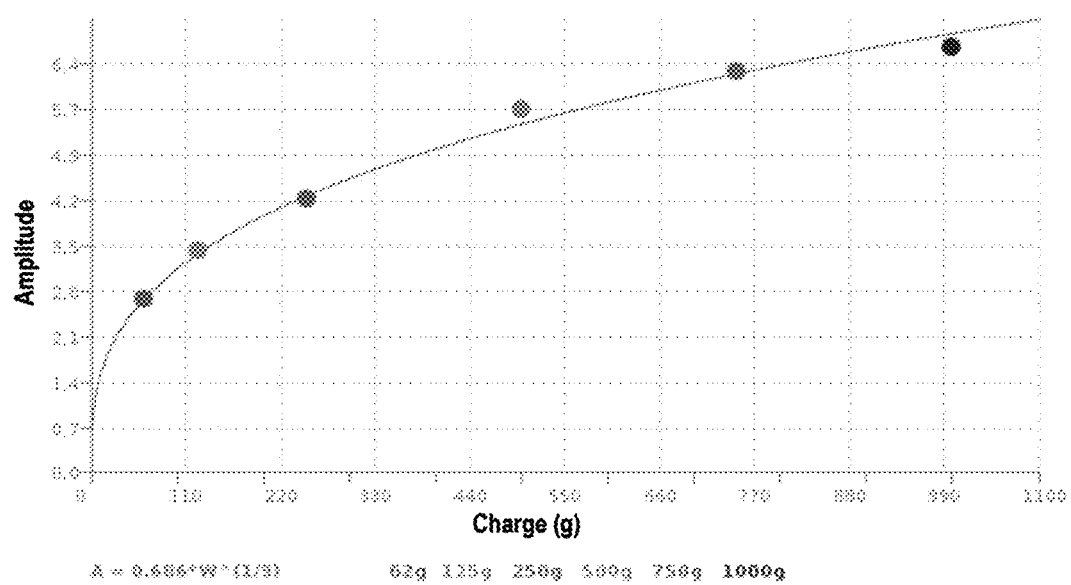
FIG. 9 illustrates the relationships of the RMS amplitude versus the weight of the charges, which follow the regression: $A = 0.673 \sqrt[3]{W}$, where W is the weight of the charges.

FIGS. 7 and 8 show the migrated seismic sections, full stack, using the records from all source weights for the two tests performed.

Considering the frequency content and continuity of the reflectors, there is a significant difference at the bottom of images A, B, C and D in FIG. 3. As noted earlier, smaller sources provide a more uniform record of a distributed frequency content in the spectrum. The image quality of the existing geological structure at the time interval of 300 ms to 600 ms on the right side of the section is better for 500 g (FIG. 3B) and 250 g (FIG. 3A) when compared to the sections related to charges of 1000 g and 750 g. Although the SPI is 160 m for each subset of equivalent charges, all migrated sections are of good quality (FIG. 7).

When comparing the energy ratio between the four data subsets, it can be noted that doubling the source weight does not result in doubling the energy:

500 g/250 g 125% increase in energy;
750 g/250 g 144% increase in energy;
750 g/500 g 115% increase in energy;
1000 g/250 g 154% increase in energy;
1000 g/500 g 123% increase in energy;
1000 g/750 g 106% increase in energy.

Those skilled in the art will value the knowledge presented herein and can reproduce the invention in the presented embodiments and in other variants, all encompassed by the scope of the appended claims.

The invention claimed is:

1. A method for improving 2D seismic acquisition, comprising
   using explosives source with different weights distributed in single charges,
   incrementing the frequency spectrum resulting from wave generation,
   stacking seismic records,
   improving resolution quality and continuity of the recorded reflections and carrying out at least the following steps:
   incrementally distributing the charges;
   individually firing of charges; and
   processing and stacking of records performed under the previous conditions,
   wherein the step of incrementally distributing the charges further comprises organizing the disposition of the plurality of dynamite charges, and
   wherein the explosive charges are dynamite and are distributed along a seismic line in a decreasing sequence configuration of weights of reference charges (C), in the form of: C, 3/4C, C/2, C/4 or C/n.

2. The method according to claim 1, wherein the reference charge value (C) is 1 Kg or 0.5 Kg and the configuration of the seismic line is in the form of: 1 Kg; 0.75 Kg; 0.5 Kg; 0.25 Kg; or 0.5 Kg; 0.25 Kg; 0.125 Kg; or 0.062 Kg.

3. The method according to claim 1, wherein the positioning of the charges in the seismic line have a distance from each other of 20 to 100 m.

4. The method according to claim 1, wherein a depth of coupling of the charges in relation to the ground is from 1 to 5 m.

5. The method according to claim 1, wherein the step of individually firing of charges further comprises detonating the explosive dynamite charges individually, recording the reflections of the seismic waves and the family of traces (gather) of each shot separately.

6. The method according to claim 5, wherein the recording of the reflections of the seismic waves is made by an arrangement of individual geophones of high sensitivity with a cutoff frequency, preferably of 5 Hz.

7. The method according to claim 6, wherein the geophones are arranged with 150 channels on each side of the shot points, spread symmetrically, 10 to 30 m apart from each other.

8. The method according to claim 1, wherein the step of processing and stacking of records, further comprises performing regularization of data, comparing the obtained results, stacking the records of different charges, integrating the results obtained in a seismic section shape and further comprising the following sub-steps:
   sub-step 3.1: Geometry;
   sub-step 3.2: Static Corrections;
   sub-step 3.3: Attenuation of coherent noises (Shot Domain);
   sub-step 3.4: Deconvolution;
   sub-step 3.5: Velocity Analysis;
   sub-step 3.6: Coherent Noise Attenuation (CDP Domain);
   sub-step 3.7: Pre-stacking migration;
   sub-step 3.8: Stacking; and
   sub-step 3.9: Filtering.

9. The method according to claim 8, wherein in sub-step 3.1, Geometry, the location tables of each source (shot) and each receiver (geophones) with their spatial coordinates are built up.

10. The method according to claim 8, wherein in sub-step 3.2, Static Corrections, corrects distortions in the focusing of reflections and false structures.

11. The method according to claim 8, wherein in sub-step 3.3, Coherent Noise Attenuation, transforms the seismogram from the space x time domain into the spatial frequency x temporal frequency domain, preferably by the fast Fourier transform in the two directions, draws a polygon where the noises occur, zeroes the amplitudes, applies the inverse transformation and returns to the space x time domain.

12. The method according to claim 8, wherein in sub-step 3.4, Deconvolution, calculates the inverse filter, transforms the long duration source pulse into a very compressed pulse, performs the convolution of the original seismic trace with the inverse filter, performs pulse compression, separates and identifies geological layers.

13. The method according to claim 8, wherein in sub-step 3.5, Velocity Analysis, analyzes velocities in the CDP domain, visually chooses each velocity that best horizontalizes the CDP hyperbola and that cause greater amplitudes in the semblance panel.

14. The method according to claim 8, wherein in sub-step 3.6, Coherent Noise Attenuation in the CDP domain, attenuates multiple reflections preferentially by filters that use the 2D Fourier transform or the Radon transform.

15. The method according to claim 8, wherein in sub-step 3.7, Pre-stacking migration, focuses the diffracted energies in the position of the diffractor point.

16. The method according to claim 8, wherein in sub-step 3.8, Stacking, horizontalizes the hyperbola for each reflector or migrates it before stacking and calculates the arithmetic mean of the samples.

17. The method according to claim 8, wherein in sub-step 3.9, Filtering, eliminates or attenuates the noise residue still present in the data.

* * * * *